E. F. BERRY.
FLEXIBLE PIPE COUPLING OR FLEXIBLE PIPE.
APPLICATION FILED JAN. 31, 1917.

1,255,577.

Patented Feb. 5, 1918.
2 SHEETS—SHEET 1.

Inventor
Edward F. Berry,
By
Attorneys

Inventor
Edward F. Berry,

UNITED STATES PATENT OFFICE.

EDWARD FRANCIS BERRY, OF NEW ORLEANS, LOUISIANA.

FLEXIBLE PIPE-COUPLING OR FLEXIBLE PIPE.

1,255,577.         Specification of Letters Patent.        Patented Feb. 5, 1918.

Application filed January 31, 1917.   Serial No. 145,659.

*To all whom it may concern:*

Be it known that I, EDWARD F. BERRY, citizen of the United States, residing at New Orleans, in the parish of Orleans and State of Louisiana, have invented certain new and useful Improvements in Flexible Pipe-Couplings or Flexible Pipes, of which the following is a specification, reference being had therein to the accompanying drawing.

This invention relates to improvements in flexible pipe couplings adapted for use either in connecting relatively long sections of pipe or for use in closely related series to provide a relatively flexible pipe, as will be apparent to persons skilled in the art from the more specific disclosure of the invention hereinafter contained.

A primary object of the invention is to provide a coupling permitting within the limits of the device relative longitudinal movement or play and relative lateral deflection of the adjoining members of the coupling, and parts immediately associated therewith, while preferably maintaining a sealed relation of the coupling members.

The preferred embodiment of the invention embraces coupling members associated with flexible sealing instrumentalities, permitting a movable association of the coupling members, but adapted in one position to seal the joint when the flow through the pipe or coupling is under pressure behind the same, and in another position to correspondingly seal the joint when the flow is induced by suction in advance of the same.

Heretofore in flexible joints of the general character here suggested, a flexible sealing flap or ring has been used between the coacting metal or equivalent members of the coupling, the sealing action being effected by the pressure of the liquid passing through the pipe or coupling against the flexible packing resulting in the expanding or thrusting of the packing against the coupling member freely related thereto. However, in such a device, where the flow is induced by suction there is a tendency to compress or draw the flexible packing away from said relatively free member of the coupling and thereby open or expose the space between the coupling members and offering opportunity for leakage or impaired service. It is to improve this condition that the present invention has been devised.

The above stated preferred embodiment of the invention more specifically, comprises the coöperating coupling members interfitted for a relative longitudinal movement or play, means for limiting such movement in both directions while at the same time permitting a rocking or lateral deflection thereof, in combination with a sealing device carried by one of the coupling members having a free flexible flap, conveniently of cylindrical formation adapted to be interposed between oppositely disposed contact surfaces on the other coupling member so that under the action of pressure and suction the flexible flap will expand or contract, as the case may be, to create a selling engagement with one or the other of said contact surfaces.

All of the foregoing will be clear from the specific description hereinafter submitted when read in connection with the accompanying drawings forming part hereof, wherein the preferred embodiment of the invention is illustrated.

In the drawings—

Figure 1:
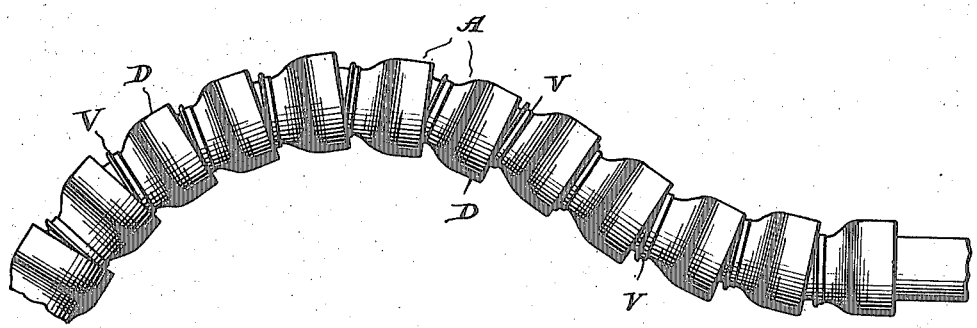
Figure 1 is an elevation of a flexible pipe composed of a number of associated flexible coupling units enabling the flexing of the pipe to almost any degree or shape to meet all ordinary conditions confronting its service, while always maintaining a sealed condition.
Figure 2:
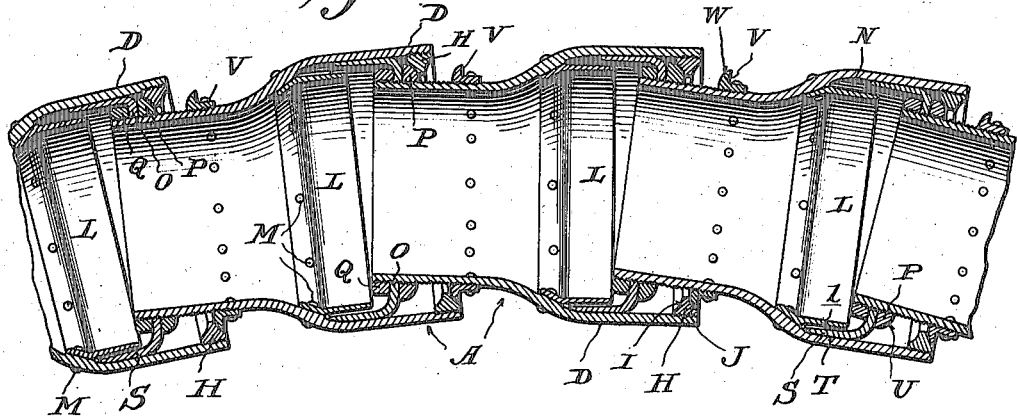
Fig. 2 is a longitudinal sectional view through a part of Fig. 1.
Figure 3:
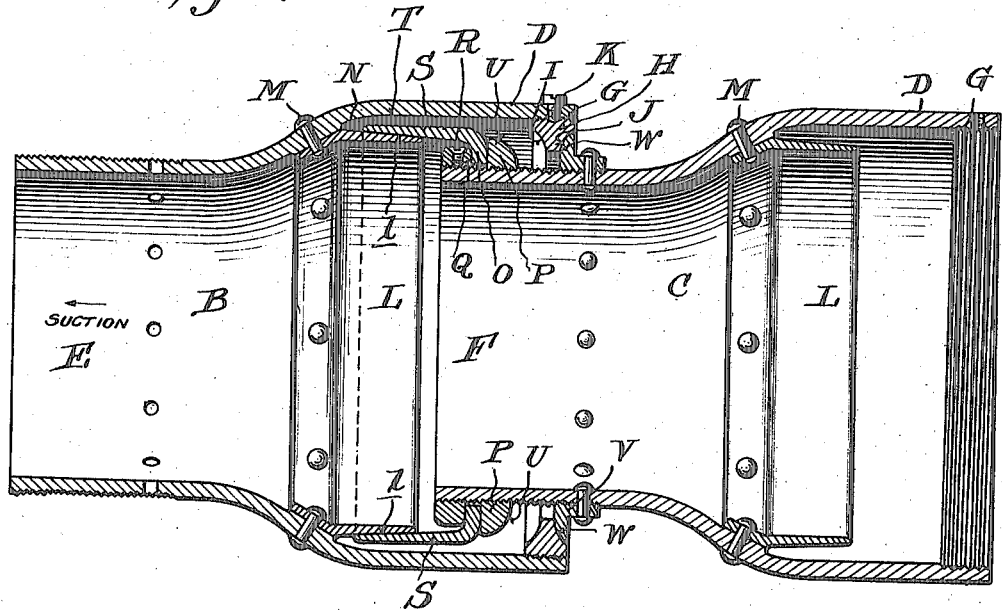
Fig. 3 is an enlarged longitudinal sectional view showing the action of the flexible sealing member under suction; and, Fig. 4 is a similar view showing the action of the same member under pressure.
Figure 4:
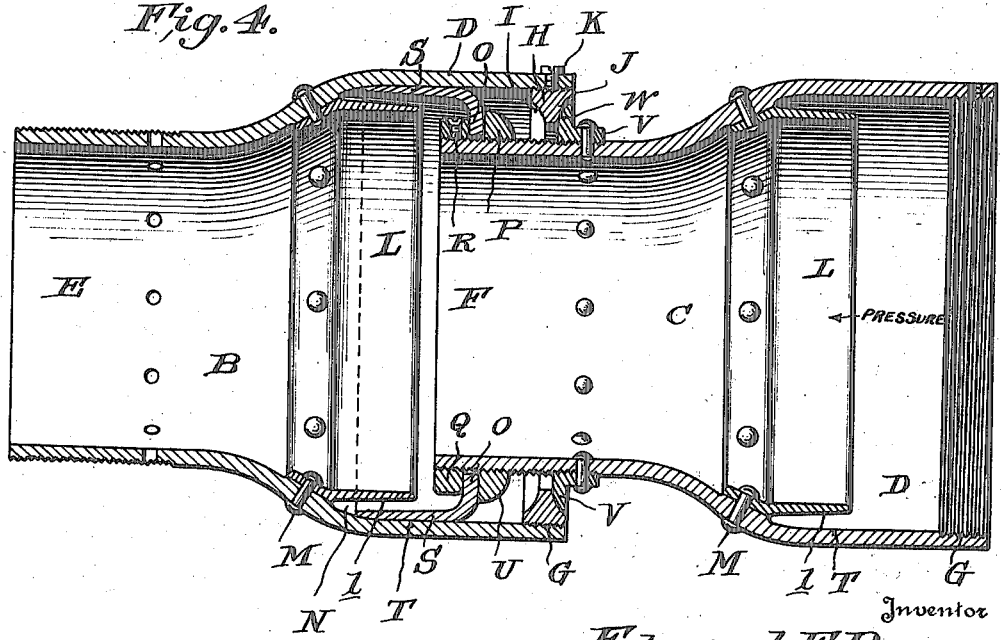

Referring more specifically to the drawings wherein like reference letters refer to corresponding parts in the several views, A represents the series of couplings immediately associated to form the flexible pipe, although it will be instantly appreciated that the flexible joint *per se* may be utilized in connecting relatively long or relatively rigid pipe sections together. Inasmuch as these pipe couplings are the same in construction throughout, it will suffice to only describe one of them specifically herein, and with this in mind B and C represent the adjoining members of a flexible pipe coupling, the former being enlarged as represented at D by flaring the metal outwardly from the reduced end E, the diameter of which latter is the normal diameter of the piping, the same as the size of the inner end F of the member C that is adapted to project into the enlarged end D. As will be readily understood, the end D of the coupling member B may be connected to an ordinary pipe extension or may directly extend into the enlarged end portion D of an adjacent coupling, and similarly the end F of the coupling member C may be connected to an ordinary length of piping or may be in turn merged into an enlarged end portion D to constitute the coöperating member of another flexible joint, all in keeping with the purposes for which the device at hand is to be used.

At the end of the enlarged portion D of the coupling member B, I provide a threaded interior, represented at G adapted to receive an externally threaded stop-ring and bearing H having dished or concaved opposite faces I and J. When in place the ring is prevented from changing its position or becoming separated from the coupling member which carries the same by a locking screw K passing through the enlarged end portion D into impingement with the stop and bearing ring H.

At a point approximately the inner end of the enlarged portion D, and intermediate of the same and the reducing end portion E, I fasten a relatively rigid ring L through the medium of rivets or equivalent devices M passing through one edge portion of the ring and the member B, this ring L being desirably of metal the same as all of the parts of the device save the packing to be presently discussed, and separated from the enlarged end portion D to provide an intervening space N.

O is a packing member, to which I have alluded, the same comprising a heavy disk of rubber fabric, reinforced if desired, sleeved upon the end F of the coupling member C and between clamping rings P and Q threaded upon the complemental threaded exterior of the end portion F, the ring Q being in turn locked against escape by a locking screw R passing therethrough into impinging relation with said end portion F.

The edge of the packing disk O merges into an offset reduced flexible cylindrical portion or flap S adapted to give outwardly or inwardly in keeping with the influence exerted thereon by the action of the flow within the piping, and with reference to the inner contact surface T of the enlarged portion D and the outer contact surface $l$ of the ring L.

The clamping ring P has a rounded or convexed surface U adapted to engage the bearing surface I of the ring H in the outermost limit of movement of the coupling member C in the coupling member B to permit a rocking play or deflection of the coupling members to permit the members to assume angular relation as will be obvious.

To limit the inward movement of the coupling member C with reference to the coupling member B, while permitting lateral rocking or deflection of the coupling members, I provide a stop-ring V threaded or riveted upon and secured in desired position to the member C at a point beyond the end of the enlarged portion D of the coupling member B, this stop-ring V in turn being provided with a rounded or convexed surface W to contact and act with the bearing J of the stop-ring H similarly to the action of the surfaces U and I just described.

From the foregoing description it will be seen that the two coupling members B and C have a free longitudinal or telescopic movement within the limits defined by the adjustment of the various parts, while at the same time the members are always free to assume an angular relation with respect to each other; and irrespective of the position of the coupling members there will always be a sealed relation therebetween by means of the flexible sealing or packing ring or member S, it being apparent that when the flow through the piping is in the direction of the arrow with pressure behind the liquid, the internal pressure will cause the annular flap or tongue S to expand into an extensive surface engagement with the contact surface T of the enlarged portion D of the coupling member B, and on the other hand, when the flow is induced by suction in advance of the liquid, the member S is drawn into surface engagement with the contact surface $l$ of the ring L and thereby correspondingly seals the space between the coupling members.

While I have herein disclosed one special embodiment of the invention, it will be appreciated that the invention is capable of embodiment in other forms and devices without departing from the spirit thereof and as may be in keeping with the scope of the hereto appended claims.

Having thus described the invention, what I claim is:

1. A flexible coupling of the character described comprising sealed interfitting members having coöperating bearing surfaces to constitute a ball joint, and said members being formed to permit telescopic movement of said members without breaking the sealed relation thereof, substantially as described.

2. A flexible coupling of the character described comprising two interfitting telescopic members each having oppositely disposed bearing surfaces adapted to constitute ball joints when the members are telescoped or extended, respectively, to their relative limits of movement.

3. A flexible coupling of the character described comprising interfitting members having coöperating bearing surfaces to constitute a ball joint, and said members being formed to permit telescopic movement of said members in combination with a packing member for sealing the space between the coupling members irrespective of the position of said members telescopically or on the ball joint.

4. A flexible coupling of the character described comprising interfitting members, a flexible packing carried by the inner member having an extensive free portion adapted to contact with the outer member to create a sealing engagement while permitting longitudinal and lateral movements of the members, and a stop on the inner member adapted to engage a coöperating stop on the outer member to limit the inward movement of the inner member with reference to the outer member, the stop portions having complemental bearing surfaces permitting relative rocking movements of the interfitting members when said stop portions are in contact.

5. A flexible coupling of the character described comprising interfitting members, a flexible packing carried by the inner member having an extensive free portion adapted to contact with the outer member to create a sealing engagement while permitting longitudinal and lateral movements of the members, and a stop on the inner member adapted to engage a coöperating stop on the outer member to limit the inward movement of the inner member with reference to the outer member, in combination with another stop portion on the inner member coöperating with said stop portion on the outer member for limiting the outward movement of the inner member with reference to the outer member, the stop portions having complemental bearing surfaces permitting relative rocking movements of the interfitting members when said stop portions are in contact.

6. A flexible coupling of the character described comprising interfitting members, a packing member on one of said members having an extensive free portion adapted to engage the other of said members to maintain sealing engagement while permitting relative longitudinal and lateral movements of said members, and stop portions for limiting the inward and outward movements of said members with reference to each other, and a contact portion carried by one of the members and spaced therefrom to permit the free portion of the packing member to occupy the space therebetween, substantially as and for the purpose described.

7. A flexible coupling of the character described comprising interfitting members, a flexible packing carried by the inner member having an extensive free portion adapted to contact with the outer member to create a sealing engagement while permitting longitudinal and lateral movements of the members, and a stop on the inner member adapted to engage a coöperating stop on the outer member to limit the inward movement of the inner member with reference to the outer member, and a contact portion carried by one of the members and spaced therefrom to permit the free portion of the packing member to occupy the space therebetween, substantially as and for the purpose described.

8. A flexible coupling of the character described comprising interfitting members, a flexible packing carried by the inner member having an extensive free portion adapted to contact with the outer member to create a sealing engagement while permitting longitudinal and lateral movements of the members, and a stop on the inner member adapted to engage a coöperating stop on the outer member to limit the inward movement of the inner member with reference to the outer member, in combination with another stop portion on the inner member coöperating with said stop portion on the outer member for limiting the outward movement of the inner member with reference to the outer member, and a contact portion carried by one of the members and spaced therefrom to permit the free portion of the packing member to occupy the space therebetween, substantially as and for the purpose described.

9. A flexible coupling of the character described comprising interfitting members, a flexible packing carried by the inner member having an extensive free portion adapted to contact with the outer member to create a sealing engagement while permitting longitudinal and lateral movements of the members, and a stop on the inner member adapted to engage a coöperating stop on the outer member to limit the inward movement of the inner member with reference to the outer member, the stop portions having complemental bearing surfaces permitting relative rocking movements of the interfitting members when said stop portions are in contact, and a contact portion carried by one of the members and spaced therefrom to permit the free portion of the packing member to occupy the space therebetween, substantially as and for the purpose described.

10. A flexible coupling of the character described comprising interfitting members, a flexible packing carried by the inner member having an extensive free portion adapted to contact with the outer member to create a sealing engagement while permitting longitudinal and lateral movements of the members, and a stop on the inner member adapted to engage a coöperating stop on the outer member to limit the inward movement of the inner member with reference to the outer member, in combination with another stop portion on the inner member coöperating with said stop portion on the outer member for limiting the outward movement of the inner member with reference to the outer member, the stop portions having complemental bearing surfaces permitting relative rocking movements of the interfitting members when said stop portions are in contact, and a contact portion carried by one of the members and spaced therefrom to permit the free portion of the packing member to occupy the space therebetween, substantially as and for the purpose described.

11. A coupling comprising interfitting members, one having oppositely disposed contact surfaces and the other carrying a sealing member adapted to engage one of said contact surfaces under pressure and the other under suction.

12. A coupling comprising interfitting members, one having longitudinally disposed contact surfaces and the other carrying a flexible packing member having an extended longitudinally disposed free portion adapted to create sealing engagement with one of said contact surfaces under pressure, and with the other of said contact surfaces under suction.

13. A coupling comprising interfitting members, the outer member being provided with an annular contact device spaced from the interior thereof to afford oppositely disposed contact surfaces, and the inner member carrying a packing having a free portion introduced between said contact surfaces and adapted to create a sealing engagement therewith, the one under pressure and the other under suction.

14. A coupling comprising interfitting members, one having oppositely disposed contact surfaces and the other carrying a sealing member adapted to engage one of said contact surfaces under pressure and the other under suction, and means permitting relative longitudinal movement of the interfitting members, while constantly maintaining the sealing means in operative relation to its coöperating contact surfaces.

15. A coupling comprising interfitting members, one having longitudinally disposed contact surfaces and the other carrying a flexible packing member having an extended longitudinally disposed free portion adapted to create sealing engagement with one of said contact surfaces under pressure, and with the other of said contact surfaces under suction, and means permitting relative longitudinal movement of the interfitting members, while constantly maintaining the sealing means in operative relation to its coöperating contact surfaces.

16. A coupling comprising interfitting members, the outer member being provided with an annular contact device spaced from the interior thereof to afford oppositely disposed contact surfaces, and the inner member carrying a packing having a free portion introduced between said contact surfaces and adapted to create a sealing engagement therewith, the one under pressure and the other under suction, and means permitting relative longitudinal movement of the interfitting members, while constantly maintaining the sealing means in operative relation to its coöperating contact surfaces.

17. A coupling comprising interfitting members, one having oppositely disposed contact surfaces and the other carrying a sealing member adapted to engage one of said contact surfaces under pressure and the other under suction, and means permitting relative longitudinal and lateral movement of the interfitting members, while constantly maintaining the sealing means in operative relation to its coöperating contact surfaces.

18. A coupling comprising interfitting members, one having longitudinally disposed contact surfaces and the other carrying a flexible packing member having an extended longitudinally disposed free portion adapted to create sealing engagement with one of said contact surfaces under pressure, and with the other of said contact surfaces under suction, and means permitting relative longitudinal and lateral movement of the interfitting members, while constantly maintaining the sealing means in operative relation to its coöperating contact surfaces.

19. A coupling comprising interfitting members, the outer member being provided with an annular contact device spaced from the interior thereof to afford oppositely disposed contact surfaces, and the inner member carrying a packing having a free portion introduced between said contact surfaces and adapted to create a sealing engagement therewith, the one under pressure and the other under suction, and means permitting relative longitudinal and lateral movement of the interfitting members, while constantly maintaining the sealing means in operative relation to its coöperating contact surfaces.

20. A flexible coupling of the character described comprising interfitting members having coöperating bearing surfaces to constitute a ball joint, and said members being formed to permit telescopic movement of said members, in combination with a packing member for sealing the space between the coupling members irrespective of the position of said members telescopically or on the ball joint, said packing member being carried by one of the coupling members and having a part freely related to the other coupling member adapted to be sealed by pressure within the coupling.

21. A flexible coupling of the character described comprising interfitting members having coöperating bearing surfaces to constitute a ball joint, and said members being formed to permit telescopic movement of said members, in combination with a packing member for sealing the space between the coupling members irrespective of the position of said members telescopically or on the ball joint, said packing member being carried by one of the coupling members and having a part freely related to the other coupling member adapted to be sealed by pressure within the coupling, and a part on said other member for creating a similar seal by suction on the interior of the coupling.

22. A pipe coupling having interfitting members, and packing instrumentalities interposed therebetween adapted under pressure within the coupling to create a sealing engagement, and also under suction within the coupling to create a similar sealing engagement, substantially as described.

23. A flexible pipe coupling comprising sealed interfitting members arranged for a relatively free lateral play with reference to each other and a longitudinal play one over the other without breaking the sealed relation thereof, in combination with coacting surfaces adapted to constitute a ball joint in one position of the parts, substantially as described.

24. A flexible pipe coupling comprising interfitting members arranged for a relatively free lateral play with reference to each other and a longitudinal play one over the other, in combination with coacting surfaces adapted to constitute separate ball joints, respectively, acting in opposite positions of the parts.

25. A flexible pipe coupling comprising interfitting members arranged for a relatively free lateral play with reference to each other and a longitudinal play one over the other, in combination with coacting surfaces adapted to constitute a ball joint in one position of the parts, in combination with packing means for sealing the joint notwithstanding the varying positions of the members.

26. A flexible pipe coupling comprising interfitting members arranged for a relatively free lateral play with reference to each other and a longitudinal play one over the other, in combination with coacting surfaces adapted to constitute separate ball joints, respectively, acting in opposite positions of the parts, in combination with packing means for sealing the joint notwithstanding the varying positions of the members.

27. A flexible pipe coupling comprising interfitting members arranged for a relatively free lateral play with reference to each other and a longitudinal play one over the other, in combination with coacting surfaces adapted to constitute a ball joint in one position of the parts, in combination with packing means for sealing the joint notwithstanding the varying positions of the members, said packing means having relatively free portions and means coöperating therewith for forcing said free portions into sealing engagement under pressure and suction within the coupling.

28. A flexible pipe coupling comprising interfitting members arranged for a relatively free lateral play with reference to each other and a longitudinal play one over the other, in combination with coacting surfaces adapted to constitute separate ball joints, respectively, acting in opposite positions of the parts, in combination with packing means for sealing the joint notwithstanding the varying positions of the members, said packing means having relatively free portions, and means coöperating therewith for forcing said free portions into sealing engagement under pressure and suction within the coupling.

In testimony whereof I hereunto affix my signature in the presence of two witnesses.

EDWARD FRANCIS BERRY.

Witnesses:
  MARY BERRY,
  FRED SOHE.